Patented July 31, 1934

1,968,552

UNITED STATES PATENT OFFICE 1,968,552

OXIDATION OF ALCOHOLS

Harlan A. Bond, Metuchen, and Lee B. Smith, Woodbridge, N. J., assignors, by mesne assignments, to E. I. du Pont de Nemours and Company, a corporation of Delaware No Drawing. Application April 15, 1930, Serial No. 444,601

9 Claims. (Cl. 260—138)

This invention relates to processes for the production of aliphatic aldehydes from mixtures of the corresponding alcohol and oxygen containing gases in the presence of a catalyst.

The catalysts here employed are especially applicable to the oxidation of lower members of the aliphatic alcohol series such as methanol, ethanol, butanol and the like. It will be understood that conditions hereinafter referred to such as temperature, space velocity and the alcohol-oxygen containing gas ratio will be subject to the usual experimental variation which one familiar with this art ordinarily finds necessary in proceeding from member to member of a series of organic compounds. Moreover said catalyst bodies will not function at temperatures so extreme that sintering, fusing or other like injuries result. Nor are they applicable if poisoned, corroded or enveloped by solid deposits of an inactive material such as carbon.

The preparation, and properties of these catalysts will now be specifically described and their use illustrated in terms of the oxidation of methanol to formaldehyde with air. It will be understood however that the specific illustrative means chosen will not limit the scope of the invention.

The catalysts consist mainly or entirely of that form of silver obtained by electrolytic deposition from solutions of silver salts. The type is commonly known to the metal refining art as electrolytic silver crystals and is usually prepared by electrodeposition from acid solutions of Ag salts such as solutions containing nitric acid. The material is crystalline and somewhat porous in structure and granular in appearance. Its composition is uniform and reproducible. It ordinarily contains about 99.9% metallic silver.

The crystals themselves are excellent catalytic material and may be used per se. The surface of these crystals is very irregular and very satisfactory catalysts may also be prepared by causing to adhere to these crystals, small amounts of dehydrogenating catalyst promoters. The oxides of tungsten, vanadium, cerium, thorium, molybdenum, chromium, aluminum, zinc, and the like are suitable. The promoters herein employed are oxides which are substantially non-reducible under the conditions of preparation and use of the catalyst bodies. The promoting oxide may form up to 10% of the total weight of the catalyst material. Smaller amounts of promoter are preferred however, and amounts comprising less than 1% of the catalyst weight have given excellent results.

As a catalyst for the oxidation of methanol to formaldehyde, this electrolytic crystal silver material possesses marked qualities. It is very selective and has little tendency to promote side reactions or the formation of by-products under conditions which permit high overall yields. Experimental results indicate that its activity, which is estimated by the rate of conversion of the methanol to formaldehyde at a given temperature, is two or three times as great as that of cold drawn or reworked silver, such as silver wire or cast silver. A catalytic bed of this material has a thermal conductivity in all directions which is superior to that from layer to layer of a silver wire netting, for example. It is stable under the conditions of the reaction, and does not readily fuse or sinter at the temperatures at which the process is carried out, nor does it tend to disintegrate into a fine powder.

The crystal silver used as such requires practically no preparation, since all that is necessary is to screen it into convenient sizes and pour it into the reaction chamber where with a little shaking or jarring it will compactly and uniformly arrange itself or may be compressed to such extent as not to reduce the porosity of the mass. A catalytic mass composed of particles which screen between 4 and 20 mesh has been found very satisfactory. Some variation in sizes can be made so long as the catalyst material is not so fine that the gas flow is impeded or so coarse that channeling and poor contact results.

Many variations may be employed in preparing the promoted silver crystal catalysts. Broadly, the path to be followed is to impregnate the somewhat porous and irregular silver crystals with a decomposable salt from which the promoting oxide may be obtained or with the oxide itself. The application of heat will ordinarily suffice to prepare the oxide in situ from silver crystals and adhering decomposable salts. A purified suspension or colloidal solution of the desired promoting oxide, prepared by any of the ordinary methods, may also be flocculated while in contact with the silver crystals. The amount of the promoting oxide will be regulated by the amount of salt, suspended oxide or colloid present in the solution or suspension contacted with the silver. The promoter, may be precipitated by evaporation of the accompanying liquid in which it is dissolved or suspended. The promotor may, if colloidal, also be precipitated by the addition of a precipitating agent, for example a volatile electrolyte such as HCl. The silver crystals should be vigorously stirred during the precipitation of the colloidal promoting material.

*Preparation electrolytic silver crystals*

Electrolytic silver crystals as purchased by this name from metal refiners are screened to pass a 4 mesh sieve and be retained by a 20 mesh sieve. If necessary to remove traces of the bath the crystals may be washed and dried at 100–150° C.

*Preparation promoted electrolytic silver crystals*

Electrolytic silver crystals screened to pass a 4 mesh sieve and be retained by a 20 mesh sieve, were submerged in 1% aqueous solution of cerium nitrate. Suction was applied to remove the air from the pores of the crystals. The excess liquid was then drained off and the crystals placed in an oven and dried at 150° C.

In the example the term "overall yield" denotes the percentage of methanol, passed into the reaction vessel, that is actually converted to formaldehyde. The theoretical yield is the percentage obtained by comparing the equivalents of formaldehyde produced with the methanol which has actually been used up during the reaction, that used up being determined by subtracting the methanol appearing in the final product from the total methanol that entered the reaction vessel.

*Example 1.*—By passing a mixture of air and methanol in a 2:1 ratio at a space velocity of 50,000 per hour through a catalyst consisting of electrolytic silver crystals at a temperature of about 500° C., a theoretical yield of 87% and an overall yield of 79% of formaldehyde was obtained.

The above reaction proceeds most favorably at temperatures between 500° and 800° C. However, formaldehyde can be produced from methanol at temperatures on either side of these limits. The space velocities with which the gases are conducted through the reaction zone will depend upon the type of apparatus and the temperature employed, but, in general, space velocities of 25,000 to 200,000 per hour have been found satisfactory. The ratio of air to methanol can be varied considerably. Ratios of about 1½ to 2½ volumes of air to each volume of methanol have been found to produce excellent results. Loosely packed beds of catalyst resting on the bottom of a reaction chamber and of a thickness from about ½ to several inches have given good results. In general the arrangement and dimensions of the catalyst bed should permit a close control of temperature within the catalyst and will vary considerably with the type and size of apparatus employed.

We claim:

1. A process for producing an aliphatic aldehyde comprising reacting a mixture of a lower aliphatic alcohol and a molecular oxygen containing gas in the presence of electrolytic silver crystals.

2. A process for producing an aliphatic aldehyde comprising reacting a mixture of a lower aliphatic alcohol and a molecular oxygen containing gas in the presence of electrolytic silver crystals electrodeposited from acid solutions containing silver salts.

3. A process for producing an aliphatic aldehyde comprising reacting a mixture of a lower aliphatic alcohol and a molecular oxygen containing gas in the presence of electrolytic silver crystals promoted with a small amount of oxide of a metal selected from the group consisting of tungsten, vanadium, cerium, thorium, molybdenum, zinc, aluminum and chromium.

4. A process for producing an aliphatic aldehyde comprising reacting a mixture of a lower aliphatic alcohol and a molecular oxygen containing gas in the presence of electrolytic silver crystals promoted with up to about 1% by weight of an oxide of a metal selected from the group consisting of tungsten, vanadium, cerium, thorium, molybdenum, zinc, aluminum and chromium.

5. A process for the production of formaldehyde comprising reacting a mixture of methanol and a molecular oxygen containing gas in the presence of electrolytic silver crystals.

6. A process for the production of formaldehyde comprising reacting a mixture of methanol and a molecular oxygen containing gas at about 500 to 800° C., in the presence of electrolytic silver crystals.

7. A process for the preparation of formaldehyde comprising reacting a mixture of methanol and a molecular oxygen containing gas at about 500 to 800° C., in the presence of electrolytic silver crystals promoted by a small amount of an oxide of a metal selected from the group consisting of tungsten, vanadium, cerium, thorium, molybdenum, zinc, aluminum and chromium.

8. A process for the preparation of formaldehyde comprising reacting a mixture of methanol and a molecular oxygen containing gas, in the presence of electrolytic silver crystals carrying up to about 10% of an oxide of a metal from the group consisting of tungsten, vanadium, cerium, thorium molybdenum, zinc, aluminum and chromium oxides.

9. A process for the preparation of formaldehyde comprising reacting a mixture of methanol and a molecular oxygen containing gas in the presence of electrolytic silver crystals carrying up to about 1% of an oxide of a metal selected from the group consisting of tungsten, vanadium, cerium, thorium, molybdenum, zinc, aluminum and chromium.

HARLAN A. BOND.
LEE B. SMITH.